(No Model.)

J. W. WILBRAHAM.
ROTARY GAS EXHAUSTER.

No. 552,459. Patented Dec. 31, 1895.

Witnesses:
Hamilton D. Turner
R. Schleicher

Inventor
John W. Wilbraham
by his Attorneys
Howson & Howson

UNITED STATES PATENT OFFICE.

JOHN W. WILBRAHAM, OF PHILADELPHIA, PENNSYLVANIA, ASSIGNOR TO THE WILBRAHAM-BAKER BLOWER COMPANY, OF TRENTON JUNCTION, NEW JERSEY.

ROTARY GAS-EXHAUSTER.

SPECIFICATION forming part of Letters Patent No. 552,459, dated December 31, 1895.

Application filed October 24, 1892. Serial No. 449,850. (No model.)

*To all whom it may concern:*

Be it known that I, JOHN W. WILBRAHAM, a citizen of the United States, and a resident of Philadelphia, Pennsylvania, have invented certain Improvements in Rotary Gas-Exhausters, of which the following is a specification.

One object of my invention is to so construct a rotary gas-exhausting apparatus as to render the same more compact than usual by dispensing with the necessity of a shaft-bearing outside of the pulley which receives the driving-belt, a further object being to provide for the thorough and constant lubrication of the shaft-bearing and the stuffing-box for the shaft. These objects I attain in the manner hereinafter set forth, reference being had to the accompanying drawings, in which—

Figure 1:
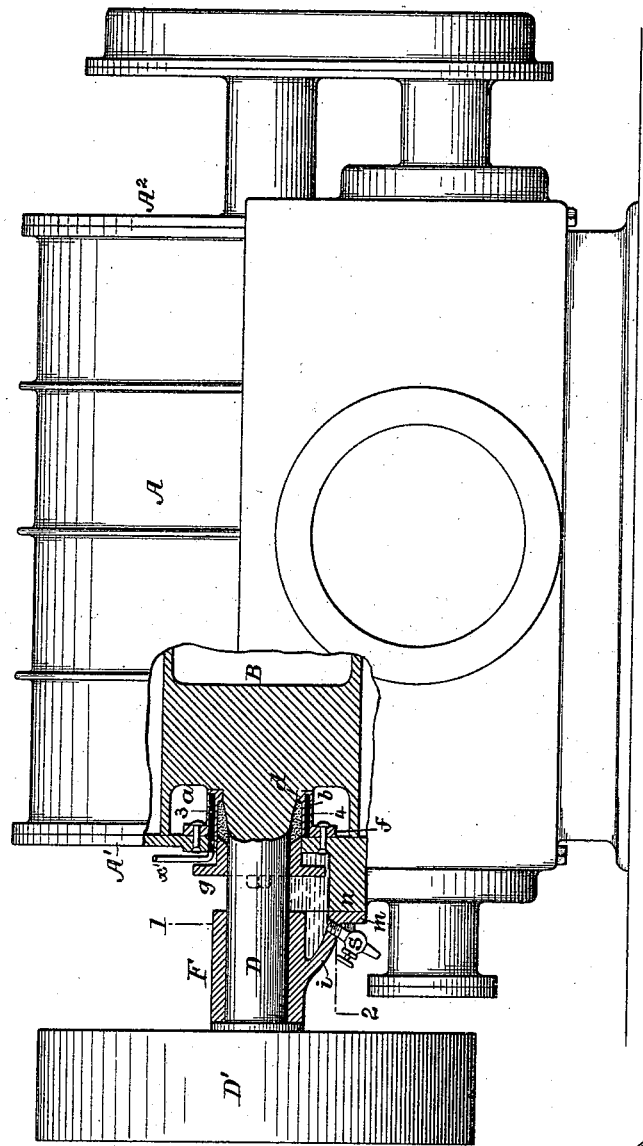
Figure 2:
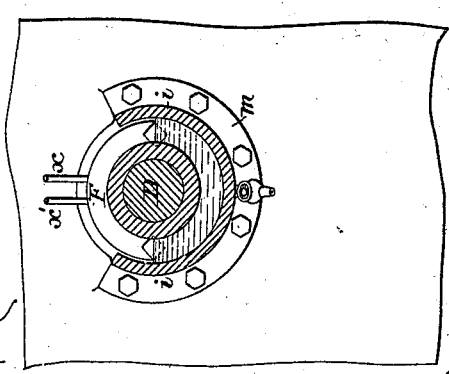
Figure 3:
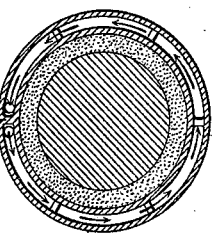

Figure 1 is a side view, partly in section, of a rotary gas-exhauster constructed in accordance with my invention. Fig. 2 is a transverse section on the line 1 2, Fig. 1, and Fig. 3 is an enlarged transverse section on the line 3 4, Fig. 1.

In the drawings, A represents the body, and A' A² the end plates of the casing of a gas-exhauster which, as shown, is what is known as the "Wilbraham" exhauster, constructed on the Baker system, the internal construction of the same being shown, for instance, in Patent No. 182,503. In these exhausters it is necessary to provide the shaft D of the main cylinder B with a stuffing-box to prevent escape of the gas, and also with an outside bearing to support said shaft and resist the pull of the belt upon the driving-pulley D', and these stuffing-boxes have hitherto been external or beyond the end of the casing A and the outer bearings have been independent of said casing and arranged outside of the driving-pulley, special pedestals and foundations being required for said outer bearings. In carrying out my present invention, however, I provide for the use of the stuffing-box, and yet permit the mounting of the shaft-bearing directly upon the end casing of the machine, thereby obviating the trouble and expense of the separate bearing and its foundation and overcoming the difficulty frequently experienced in properly aligning the outer bearing in respect to the bearings in the casing A.

In order to accomplish this result I form in the end of the cylinder B a recess $a$ and form upon or secure to the end A' of the casing an internal or inwardly-projecting stuffing-box, the only portion of said stuffing-box which projects beyond the end of the casing being the outer portion of the follower. Hence the bearing for the driving-shaft can be located so close to the end of the casing that it can be mounted directly upon the same without objectionable overhang.

In the drawings the internal projecting stuffing-box is shown in the form of a tube $b$ having at the inner end a short internal projecting flange which bears upon the shaft D, said tube having also an outer outwardly-projecting flange $f$, which is bolted or riveted to the end plate of the casing A, the follower G passing through an opening in the end plate so as to compress the packing material within the tube $b$, said follower being actuated by nuts or bolts in the usual way.

The bearing F for the shaft D has a web $i$ and a segmental flange $m$, the latter being bolted to a bearing-face formed on a thickened segmental projecting portion or boss $n$ on the end plate A' of the casing, as shown in Figs. 1 and 2. This segmental projection or boss $n$ and also the web $i$ of the bearing F are carried around to a point somewhat above the center of the shaft and thus constitute an oil receptacle and provide for the continuous lubrication of the bearing F and also of the packing material in the stuffing-box, for it should be understood that the latter has a tendency to dry out rapidly, owing to the high degree of heat of the gas passing through the exhauster. A suitable drainage-cock $s$ is provided for removing the oil from the chamber when it is desired to remove the bearing or gain access to the stuffing-box.

In order to protect the packing in the stuffing-box from heat as much as possible, I prefer to make the tube $b$ with a hollow shell, having a transverse partition $w$, as shown in Fig. 3, so that water introduced through a pipe $x$ on one side of said partition will circulate around the stuffing-box before escaping through a pipe $x'$ on the opposite side of the partition, and will thus tend to keep the tube reasonably cool. The hollow shell may be braced by studs crossing from wall to wall of the same at intervals if desired.

It will be evident that the internal projecting tube $b$ might in some cases be cast directly upon the end plate $A'$ of the casing; but the formation of said tube as a separate piece secured in position upon the end plate is preferred.

Having thus described my invention, I claim and desire to secure by Letters Patent—

1. A rotary gas exhauster or blower having a cylinder with the recessed end, a stuffing box projecting inward from one of the end plates of the casing into said recess and having an external follower, and a bearing for the driving shaft independent of and located outwardly beyond said stuffing box, said bearing being mounted upon the end plate of the casing, substantially as specified.

2. A rotary gas exhauster or blower having a stuffing box projecting inward from one of the end plates of the casing and having a bearing for a driving shaft mounted upon said end plate, said bearing having a flanged segmental web and the end plate having a segmental projection or boss so as to form an oil receptacle for supplying the bearing and stuffing box, substantially as specified.

3. The combination of the end plate of a rotary gas exhauster or blower, with a flanged tube secured thereto and projecting inwardly therefrom and constituting part of the stuffing box casing, an external follower for said stuffing box, and an external driving shaft bearing mounted upon said end plate of the casing, substantially as specified.

4. The combination of the end plate having an internally projecting stuffing box casing consisting of a hollow shell with partition therein, and means for supplying water to said shell on one side of the partition, and discharging it on the opposite side of the same so as to cause a circulation of water through the shell, substantially as specified.

In testimony whereof I have signed my name to this specification in the presence of two subscribing witnesses.

JOHN W. WILBRAHAM.

Witnesses:
H. F. REARDON,
HARRY SMITH.